United States Patent
Henniger et al.

(10) Patent No.: US 10,634,526 B2
(45) Date of Patent: Apr. 28, 2020

(54) SENSOR MODULE AND METHOD FOR PRODUCING A SENSOR MODULE

(71) Applicant: CONTI TEMIC MICROELECTRONIC GMBH, Nuremberg (DE)

(72) Inventors: Juergen Henniger, Erlangen-Dechsendorf (DE); Matthias Keuten, Altdorf (DE); Matthias Wieczorek, Neunkirchen am Sand (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 185 days.

(21) Appl. No.: 15/322,209

(22) PCT Filed: Jun. 24, 2015

(86) PCT No.: PCT/EP2015/064289
§ 371 (c)(1),
(2) Date: Dec. 27, 2016

(87) PCT Pub. No.: WO2015/197713
PCT Pub. Date: Dec. 30, 2015

(65) Prior Publication Data
US 2018/0023982 A1    Jan. 25, 2018

(30) Foreign Application Priority Data
Jun. 26, 2014   (DE) .................. 10 2014 212 296

(51) Int. Cl.
*G01D 11/24* (2006.01)
*B29C 65/08* (2006.01)
(Continued)

(52) U.S. Cl.
CPC ............ *G01D 11/245* (2013.01); *B29C 65/08* (2013.01); *B29C 65/16* (2013.01); *B29C 65/02* (2013.01);
(Continued)

(58) Field of Classification Search
CPC ...... G01D 11/24; G01D 11/245; B29C 65/08; B29C 65/16; B29K 2995/0026
(Continued)

(56) References Cited

U.S. PATENT DOCUMENTS 5,233,871 A * 8/1993 Schwarz .............. H05K 5/0047
73/493
6,872,911 B2   3/2005 Weiblen et al.
(Continued)

FOREIGN PATENT DOCUMENTS

DE    1432081 A1    3/1996
DE    19911890 A1   10/2000
(Continued)

*Primary Examiner* — Benjamin R Schmitt
(74) *Attorney, Agent, or Firm* — Laurence A. Greenberg; Werner H. Stemer; Ralph E. Locher

(57) ABSTRACT

A sensor module contains a sensor unit, a sensor cover, and a main body. The sensor unit has a sensor surface and a base surface. The sensor cover covers the sensor surface and at least a section of the base surface. The sensor cover is connected to the base surface and/or the main body by a fused connection. The main body is connected at least to the base surface of the sensor unit by a fused connection with a selectable relative position in relation to the sensor cover. Pre-mounting of the sensor unit in a sensor cover and advantageous encapsulation of a sensor can thus be achieved.

14 Claims, 3 Drawing Sheets

(51) Int. Cl.
   *B29C 65/16* (2006.01)
   *B29C 65/00* (2006.01)
   *B29L 31/00* (2006.01)
   *B29C 65/02* (2006.01)
   *B29L 31/34* (2006.01)

(52) U.S. Cl.
   CPC ........ *B29C 65/1635* (2013.01); *B29C 66/543* (2013.01); *B29K 2995/0003* (2013.01); *B29K 2995/0026* (2013.01); *B29L 2031/34* (2013.01); *B29L 2031/752* (2013.01)

(58) Field of Classification Search
   USPC .......................................................... 73/431
   See application file for complete search history.

(56) References Cited

U.S. PATENT DOCUMENTS

| | | | |
|---|---|---|---|
| 7,372,258 | B2 | 5/2008 | Okui et al. |
| 7,918,962 | B2 | 4/2011 | Okui et al. |
| 8,597,755 | B2 | 12/2013 | Fujimoto et al. |
| 9,778,086 | B2 | 10/2017 | Arai et al. |
| 2001/0047690 | A1* | 12/2001 | Baba ................... G01L 23/222 73/514.34 |
| 2005/0218123 | A1 | 10/2005 | Hayakawa et al. |
| 2013/0050966 | A1* | 2/2013 | Frenzel ............... B29C 66/9292 361/759 |

FOREIGN PATENT DOCUMENTS

| | | |
|---|---|---|
| DE | 10306697 A1 | 8/2003 |
| DE | 10207777 A1 | 9/2003 |
| DE | 102005015119 A1 | 11/2005 |
| DE | 102005046558 A1 | 3/2007 |
| DE | 102005055949 A1 | 5/2007 |
| DE | 102007007840 A1 | 9/2007 |
| DE | 102008008336 A1 | 9/2008 |
| DE | 102007046376 A1 | 10/2008 |
| DE | 102011118642 A1 | 5/2013 |
| DE | 102011121818 A1 | 6/2013 |
| EP | 2034276 A2 | 3/2009 |
| JP | 2005508262 A | 3/2005 |
| JP | 2009063452 A | 3/2009 |
| JP | 2011133242 A * | 7/2011 ........... G01D 11/245 |
| WO | 03004211 A2 | 1/2003 |
| WO | 2013186926 A1 | 12/2013 |

* cited by examiner

SENSOR MODULE AND METHOD FOR PRODUCING A SENSOR MODULE

BACKGROUND OF THE INVENTION

Field of the Invention

The invention relates to a sensor module and to a method for producing a sensor module.

Devices in motor vehicles that provide or transmit power usually contain not only mechanical elements but also electronic components, for example sensors. In internal combustion engines and transmissions, encapsulated sensors, which can contactlessly measure for example rotational speeds of shafts or other mechanical elements, are preferably used. The encapsulation takes place by completely enclosing the sensor in a material that is suitable for protecting the sensor sufficiently from the ambient conditions in the device concerned. The encapsulated sensor must subsequently be fastened in a precisely predetermined position.

DE 10 2011 121 818 A1 discloses the arrangement of an electronic component in a housing, which is intended to protect the component. The housing is formed by a housing cover and a housing support, the component being arranged on a flap of a printed circuit board in the housing and completely enclosed by a sealing surface.

DE 10 2008 008 336 A1 discloses a method for the positional determination of a covered sensor element of a sensor arrangement and also a sensor arrangement with a correspondingly positioned sensor element.

BRIEF SUMMARY OF THE INVENTION

An object of the invention may be regarded as that of providing an alternative sensor module, in which an encapsulation is as reliable as possible and production is nevertheless as easy as possible, and at the same time particularly easy positioning and fastening of the sensor module is possible.

The object of the sensor module is achieved by a sensor module with the features of the independent claim. Advantageous embodiments and developments can be taken from the sub claims and the description that follows.

The sensor module has a sensor unit, a sensor cover and a separate main body. The sensor unit has a sensor surface and a base surface. The sensor cover covers the sensor surface and at least a portion of the base surface. The sensor cover is connected to at least one out of the base surface and the main body by way of a fused connection. The main body is connected at least to the base surface of the sensor unit by way of a fused connection with a selectable relative position in relation to the sensor cover.

The sensor unit is required as an actual sensor for the recording of a specific parameter. The sensor unit could for example be arranged on a printed circuit board and be connected to the latter by way of conductor tracks, which for instance lead to an electrical lead. For connecting the sensor unit to this lead, the sensor unit may have an interface, which is flexibly formed, for example in the form of a film with conductor tracks, or rigidly formed as a connector that can be screwed on or a socket that receives a connector. In connection with the invention, however, the form of the interface and its location are not decisive, as long as it is ensured that the sensor unit can in some way be electrically connected.

The sensor surface of the sensor unit should be understood as an effective surface, which preferably directly adjoins the sensor integrated in the sensor unit and is to be positioned at a correspondingly small and precisely determined distance from the mechanical element to be investigated. The sensor in the sensor unit, for example in the form of a semiconductor or an electromagnetic component, could be embedded in the sensor unit in such a way that it ends as close as possible to the sensor surface.

The sensor surface could lie at an end of a projection that is facing away from the base surface and be able to be covered by a shroud-shaped sensor cover.

The sensor cover is configured so as to correspond to the sensor surface and is designed in such a way as to cover the sensor unit completely and thus protect it from influences that are harmful to the sensor.

To make it easier for the sensor unit to be fastened to the main body and/or to make it easier for the sensor cover to be fastened to the sensor unit, the base surface may be used, the surface extending laterally outward and being substantially planar or stepped.

The main body should be understood in this connection as a support, which ultimately supports the entire arrangement comprising the sensor unit, the sensor cover and the interface and can be fastened to a higher-order component. The main body may also be part of a higher-order structural unit.

One particular advantage over known sensor modules is the fact that the laser welding has the effect, by way of example, that a particularly reliable encapsulation of a sensor unit with a sensor cover is brought about and, in particular, the welding performed has the effect that an already encapsulated sensor forms with the sensor cover an integral component, which can be directly used even in larger structural units and can be welded thereto, without requiring a separate mount and without impairing the integrity of the sensor during the integration of the sensor into a larger structural unit. Furthermore, in particular in components that have comparatively great production-related dimensional tolerances, the selectable relative position of the main body and the sensor cover very easily allows dimensional deviations to be compensated directly during the integration of the sensor module into the component.

It should be pointed out in this connection that a fused connection can be provided by a number of different methods. These may include in particular laser welding methods and ultrasonic welding methods. For the fusion, sufficient surface pressure between the components to be connected is brought about with the aid of a mask. At the same time, action of a laser beam suitable for the purpose or action of vibrations in the ultrasonic range may be used to carry out fusion of the two components, in which material of the cover fuses in certain regions with the material of the main body in the region treated. This produces a preferably peripheral sealing of the sensor cover.

In a particularly advantageous embodiment, at least one out of the sensor cover and the base surface, i.e. at least one of these two parts to be connected, is laser-transparent, so that action of a laser beam suitable for welding on the respectively laser-transparent component is used to introduce heat in the interface between the component that is laser-transparent and an adjoining component that is not laser-transparent, so that a material-bonding welded connection is achieved. For example, the sensor unit may be already completely encapsulated, that is to say mechanically fitted in a sensor cover, after which laser welding can be carried out even from a rearward side.

In a particularly advantageous embodiment, at least one out of the base surface and the sensor cover has an at least partially peripheral projection, the projection running perpendicularly in relation to the base surface and being designed to fuse with the material of the sensor cover or the base surface to produce a fused connection. The projection may be understood as a tongue in the sense of a tongue-and-groove connection and has a preferably quite narrow profile cross section. This configuration is advantageous for the fusion, a transparent mask exerting a surface pressure directly in the interface that is located at the projection. The adjacent material fuses and leads to particularly good sealing, so that a sealing surface that is separately produced and placed between two components is not required. Introduction of energy takes place in a spatially limited manner on a small surface area and can thus be kept low.

In a particularly preferred embodiment, the base surface is laser-transparent and the sensor cover is not laser-transparent. This allows a laser to be directed onto the desired connecting points between the sensor unit and the sensor cover in order to carry out the welding from the rear side, that is to say on a side of the base surface that is facing away from the sensor cover. Since, depending on the sensor surface chosen, the sensor cover may have a distinct projection, the positioning of a laser on the rearward side of the base surface is particularly suitable.

In a further preferred embodiment, the main body is at a distance radially from the sensor cover, so that a gap is produced between the sensor cover and the main body, the main body being arranged on the same side of the base surface as the sensor cover. This allows laser welding both of the main body and of the sensor cover to be carried out in two successive working steps with virtually no changeover of the setup. In this case, the main body would likewise not be laser-transparent.

It goes without saying that the converse variant, in which both the sensor cover and the main body are laser-transparent, but the base surface is not, is also possible. Welding could consequently be performed from a side of the sensor module that is opposite from the base surface.

In an advantageous embodiment, the sensor cover may furthermore be welded to the main body, the sensor unit being welded exclusively to the main body. In two successive working steps, which comprise the welding of the sensor cover to the main body and the welding of the base surface to the main body, the sequence being immaterial, it is possible to create a compact sensor module, in which a certain distance between the base surface and the sensor cover can be produced.

The object with respect to the method for producing such a sensor module comprises in particular the steps of providing a sensor unit having a sensor surface and a base surface, a sensor cover and a main body, arranging the sensor cover over the sensor unit in such a way that the sensor cover covers the sensor surface and at least a portion of the base surface, fusing the sensor cover to at least one out of the base surface of the sensor unit and the main body, arranging the main body on the base surface of the sensor unit and fusing the main body at least to the base surface of the sensor unit in a selectable relative position of the sensor cover and the main body.

In an advantageous embodiment, the fusing of the sensor cover to at least one out of the base surface of the sensor unit and the main body comprises the fusing of the sensor cover to the base surface.

Similarly advantageously, the method comprises arranging the main body on the base surface on the same side as the sensor cover and fusing the main body to the base surface.

The fusing of the main body at least to the base surface of the sensor unit may comprise the fusing of the main body to the base surface of the sensor unit and to the sensor cover.

The sensor cover and the sensor unit may moreover be fused to two sides of the main body that are opposite one another.

The fusing may in this case comprise welding by a laser welding method and welding with the aid of an ultrasonic welding method.

Further features, advantages and application possibilities of the present invention emerge from the following description of the exemplary embodiments and the figures. In the figures, the same designations stand for objects that are the same or similar.

DESCRIPTION OF THE INVENTION

Figure 1:
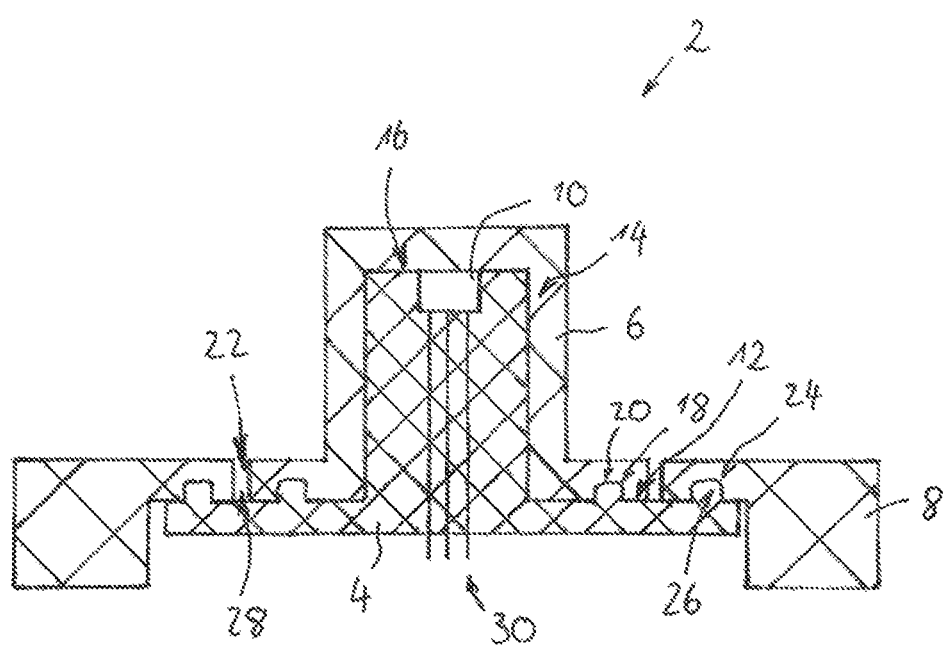
FIG. 1 shows a first exemplary embodiment of a sensor module with a sensor cover that is laser-transparent and a main body.

FIG. 1 shows a sensor module 2 having a sensor unit 4, a sensor cover 6 and a main body 8. In this exemplary embodiment, the sensor unit 4 is provided with a sensor 10, which is located on a side of a projection 14 that is facing away from the base surface 12 and protrudes into a sensor surface 16. Before a fusing operation, the base surface 12 has projections 18, which penetrate the material of the sensor cover 6, so that a fluid-tight joining region 20 is produced. After the covering of the projection 14, a kind of collar 22 closes off the sensor cover 6 radially outside the joining region 20 of the sensor cover 6.

By way of example, the sensor cover 6 is made from a material that is laser-transparent, while the sensor unit 4 consists of a material that is not laser-transparent. Irradiating for example the projections 18 through the collar 22 has the effect of producing heat in an interface between the projections 18 and the sensor cover 6, leading to the material-bonding fusion of the sensor cover 6 to the sensor unit 4.

The main body 8 is for example likewise made from a material that is laser-transparent and has a joining region 24, in which originally provided projections 26 of the sensor unit 4 fuse with the material of the main body 8. The projections 26 are at a distance radially from the projections 18, and furthermore the main body 8 is at a certain distance from the collar 22 of the sensor cover 6, so that a gap 28 to compensate for tolerances is produced there. The gap 28 is responsible for the relative position between the main body 8 and the sensor cover 6 being selectable, i.e. the sensor cover 6 and the main body 8 can be displaced in relation to one another before the fusing operation.

Once all three components have been connected to one another, an encapsulated sensor module 2 is produced, having an interface 30 for connecting the sensor 10 to an electrical lead. The main body 8 may be used for mounting the sensor module 2.

Instead of a laser welding method, an ultrasonic welding method may also be used, so that the laser transparency is not necessary for this. This applies both to the exemplary embodiment in FIG. 1 and to the subsequent exemplary embodiments.

Figure 2:
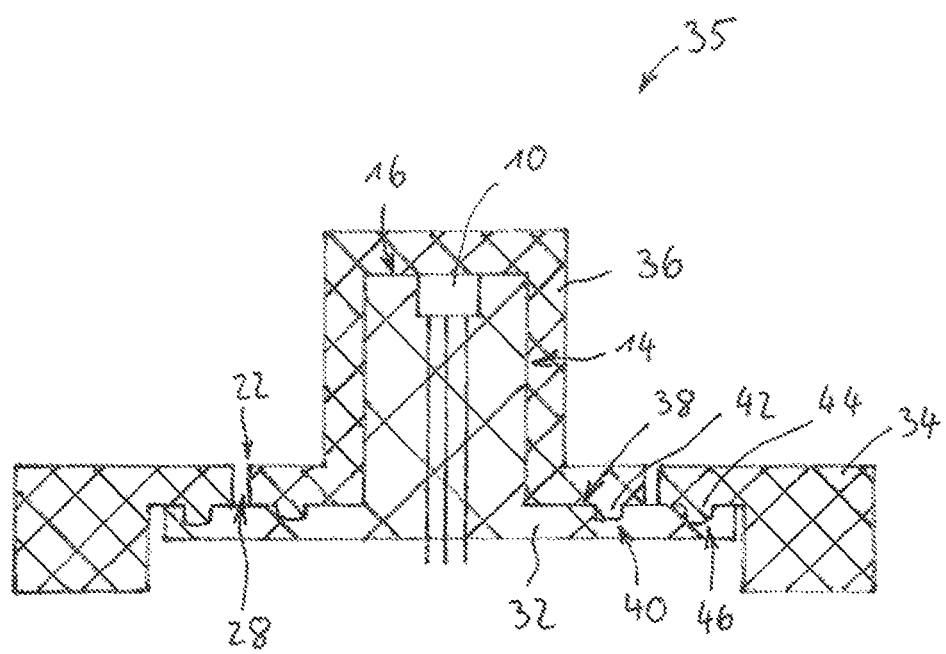
FIG. 2 shows a second exemplary embodiment of a sensor module with a sensor cover that is not laser-transparent and a main body.

In an alternative embodiment, which is shown in FIG. 2, a sensor unit 32 is provided, consisting of a material that is laser-transparent, while a main body 34 and a sensor cover 36 respectively consist of a material that is not laser-transparent. The basic structure is identical to that in FIG. 1; merely by way of example, a base surface 38 of the sensor unit 32 has a joining region 40, in which projections 42 that are originally arranged on the sensor cover 36 fuse with the material of the base surface 38.

Equally, the main body 34 has a joining region 44, in which the material of projections 46 of the base surface 38 fuses with the material of the main body 34.

A fusing of the three components may take place by irradiation with a laser from a rearward position, that is to say a side of the base surface 38 that is facing away from the sensor cover 36.

Figure 3:
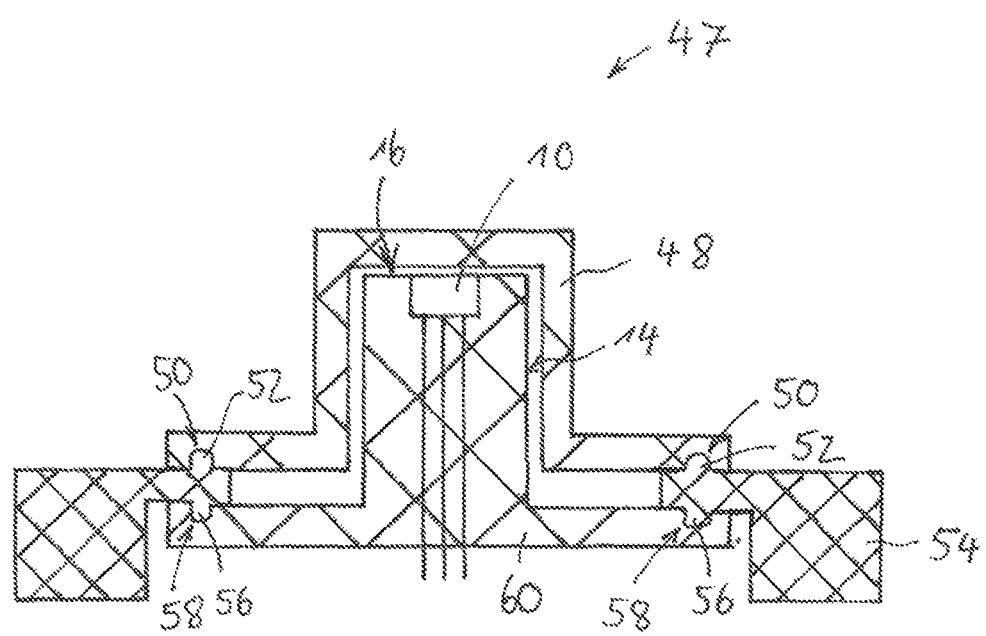
FIG. 3 shows a third exemplary embodiment with a sensor cover that is at a distance from the sensor unit.

Finally, FIG. 3 shows in a further embodiment a laser-transparent sensor cover 48, which has a joining region 50, in which the material of projections 52 of a main body 54 fuses with the material of the sensor cover 48. The sensor cover 48 is exclusively fastened on the main body 54, which is not laser-transparent.

Provided on a side of the main body 54 that is opposite from the projections 52 are further projections 56, which during the melting operation fuse with the material of the base surface in joining regions 58 of a sensor unit 60. The sensor unit 60 is made of a material that is laser-transparent and fuses exclusively with the main body 54.

The invention claimed is:

1. A sensor module, comprising:
a sensor unit having a sensor surface and a base surface;
a sensor cover covering said sensor surface and at least a portion of said base surface;
a main body, said sensor cover being connected to said base surface by a first fused connection, and said main body being connected at least to said base surface of said sensor unit by a second fused connection with a selectable relative position in relation to said sensor cover; and
a gap located radially outside said sensor cover and separating said sensor cover from said main body;
said sensor cover not resting on top of said main body.

2. The sensor module according to claim 1, wherein at least one of said sensor cover, said main body or said sensor unit consists of a material that is laser-transparent, so that action of a laser beam suitable for welding on a respectively laser-transparent component is used to introduce heat in an interface between the respectively laser-transparent component and an adjoining component that is not laser-transparent.

3. The sensor module according to claim 1, wherein at least one of said base surface or said sensor cover has an at least partially peripheral projection, said partially peripheral projection running perpendicularly in relation to said base surface and being configured to fuse with a material of said sensor cover or said base surface to produce the first fused connection.

4. The sensor module according to claim 1, wherein:
said sensor unit is formed of a material that is laser-transparent; and
said sensor cover and said main body are formed of a material that is not laser-transparent.

5. The sensor module according to claim 1, wherein:
said sensor cover and said main body are formed of a material that is laser-transparent; and
said sensor unit is formed of a material that is not laser-transparent.

6. The sensor module according to claim 1, wherein said main body is at a distance radially from said sensor cover, so that a gap is produced between said sensor cover and said main body, and said main body is disposed on a same side of said base surface as said sensor cover.

7. The sensor module according to claim 1, wherein said sensor cover is fused to said main body and said sensor unit is fused exclusively to said main body.

8. The sensor module according to claim 1, wherein at least one fused connection selected from the group consisting of the first fused connection and the second fused connection is produced by an ultrasonic welding method.

9. A method for producing a sensor module, which comprises the steps of:
providing a sensor unit having a sensor surface and a base surface;
providing a sensor cover;
providing a main body;
disposing the sensor cover over the sensor unit in such a way that the sensor cover covers the sensor surface and at least a portion of the base surface;
fusing the sensor cover to the base surface of the sensor unit; and
disposing the main body on the base surface of the sensor unit and fusing the main body at least to the base surface of the sensor unit with a selectable relative position in relation to the sensor cover, wherein a gap is located radially outside the sensor cover and separates the sensor cover from the main body and the sensor cover does not rest on top of the main body.

10. The method according to claim 9, which further comprises disposing the main body on the base surface on a same side as the sensor cover and fusing the main body to the base surface.

11. The method according to claim 9, wherein the fusing of the main body at least to the base surface of the sensor unit further comprises fusing of the main body to the base surface of the sensor unit and to the sensor cover.

12. The method according to claim 11, which further comprises fusing the sensor cover and the sensor unit to two sides of the main body that are opposite one another.

13. The method according to claim 9, which further comprises carrying out the fusing via a laser welding method or by an ultrasonic welding method.

14. The method according to claim 9, wherein the sensor cover and the main body can be displaced in relation to one another before the fusing.

* * * * *